United States Patent
Chessari

(10) Patent No.: US 11,533,932 B2
(45) Date of Patent: Dec. 27, 2022

(54) TRANSITION DEVICE FOR TEXTURED PROTEIN FOODSTUFF

(71) Applicant: ProForm Innovation Pty Limited, Mount Kuring-gai (AU)

(72) Inventor: Charlie Chessari, Mount Kuring-Gai (AU)

(73) Assignee: ProForm Innovation Pty Limited, Mount Kuring-gai (AU)

( * ) Notice: Subject to any disclaimer, the term of this patent is extended or adjusted under 35 U.S.C. 154(b) by 0 days.

(21) Appl. No.: 17/044,660

(22) PCT Filed: Apr. 4, 2019

(86) PCT No.: PCT/AU2019/050294
§ 371 (c)(1),
(2) Date: Oct. 1, 2020

(87) PCT Pub. No.: WO2019/191808
PCT Pub. Date: Oct. 10, 2019

(65) Prior Publication Data
US 2021/0037852 A1    Feb. 11, 2021

(30) Foreign Application Priority Data
Apr. 4, 2018 (AU) .............................. 2018901110

(51) Int. Cl.
*A23P 30/20* (2016.01)
*A23J 3/26* (2006.01)
*A23J 3/22* (2006.01)
*A23J 3/04* (2006.01)
*A23J 3/16* (2006.01)

(52) U.S. Cl.
CPC ............. *A23J 3/26* (2013.01); *A23J 3/227* (2013.01); *A23P 30/20* (2016.08); *A23J 3/04* (2013.01); *A23J 3/16* (2013.01)

(58) Field of Classification Search
CPC .................................................... A23P 30/20
See application file for complete search history.

(56) References Cited

U.S. PATENT DOCUMENTS

| 5,061,507 A | 10/1991 | Aulik et al. |
| 8,529,976 B2 * | 9/2013 | McMindes ............ A23J 3/227 426/601 |
| 9,877,498 B2 * | 1/2018 | Walther ............... A23J 3/227 |
| 9,907,322 B2 * | 3/2018 | McMindes ............ A23P 30/20 |
| 10,321,702 B2 * | 6/2019 | Walther ................ A23J 3/14 |
| 10,798,950 B2 * | 10/2020 | Walther ............... B29C 48/022 |
| 2005/0048178 A1 | 3/2005 | Alexander et al. |

(Continued)

FOREIGN PATENT DOCUMENTS

| CN | 101024304 A | 8/2007 |
| WO | 2015020873 A1 | 2/2015 |

OTHER PUBLICATIONS

International Search Report dated Jul. 5, 2019 in International Application No. PCT/AU19/50294, 4 pages.

*Primary Examiner* — Seyed Masoud Malekzadeh
(74) *Attorney, Agent, or Firm* — Berg Hill Greenleaf Ruscitti LLP

(57) ABSTRACT

A device for transferring molten proteinaceous extrudate material from the exit of an extrusion cooker barrel to a cooling die whilst promoting or maintaining laminar flow of said molten extrudate.

2 Claims, 4 Drawing Sheets

(56) References Cited

U.S. PATENT DOCUMENTS

| | | | | |
|---|---|---|---|---|
| 2011/0244082 A1* | 10/2011 | Vaman | ................ | A23G 1/52 |
| | | | | 426/631 |
| 2013/0108740 A1* | 5/2013 | Clarke | ............ | B29C 48/345 |
| | | | | 426/496 |
| 2015/0044334 A1* | 2/2015 | Walther | ................ | A23J 3/14 |
| | | | | 426/63 |
| 2021/0037852 A1* | 2/2021 | Chessari | ............ | A23J 3/227 |

\* cited by examiner

TRANSITION DEVICE FOR TEXTURED PROTEIN FOODSTUFF

CROSS REFERENCE TO RELATED APPLICATION

This application is a national stage application under 35 U.S.C. 371 of PCT Application No. PCT/AU2019/050294 having an international filing date of Apr. 4, 2019, which designated the United States, which PCT application claimed the benefit of Australian Application Serial No. 2018901110, filed Apr. 4, 2018, both of which are incorporated by reference in their entirety. #

TECHNICAL FIELD

The invention relates to the field of commercial extruded food manufacture. In particular, the invention relates to a device for shredding an extruded high moisture texturised protein food product.

BACKGROUND OF THE INVENTION

By 2050 the world's population is projected to reach 9 billion and it has been suggested that 70% more food will be required to sustain this population. Between 1950 and 2000 meat production increased from 45 to 229 million tons and this is expected to further increase to 465 million tons by 2050.

The relatively inefficient conversion of plant protein into animal protein via animal metabolism makes meat production responsible for a disproportionate share of environmental pressures such as land use, freshwater depletion, global warming and biodiversity loss.

A solution to reduce the impact of meat production on the environment is offered by partial replacement of meat protein with plant protein products in the human diet. However, there is a desire that these protein products have favourable organoleptic properties, such as flavour and texture, when compared with meat.

Both the food industry and food scientists have been interested in creating fibrous food textures for several decades now. High Moisture Extrusion Cooking (HMEC) technology as a concept has been established since the early 1980's. It is a technology for texturising protein-rich materials having a moisture content of greater than about 30% by mass.

In a typical HMEC process according to the prior art, the raw materials are heated under pressure in an extrusion cooker until molten; the resulting melt is cooled and solidified in-situ by a cooling die to produce aligned protein fibres from the melt, giving a product with a fibrous internal texture that satisfies organoleptic requirements.

However, for the product to fulfil its purpose of accurately resembling cooked muscle meat to the consumer, it is required that laminar flow of the molten extrudate is established prior to cooling and solidification extrudate. However, designing equipment to achieve this condition has hitherto been characterised by trial-and-error. This also limits the ability of the process to be successfully scaled up or adapted to different extrusion cooker and cooling die designs.

Accordingly, it is an object of the invention to provide a device a for establishing laminar flow for HMEC extrudate exiting an extrusion cooker while transferring the extrudate to a cooling die that ameliorates at least some of the problems associated with the prior art.

SUMMARY OF THE INVENTION

The invention is characterised by a device connecting the outlet of an extrusion cooker with the inlet of a cooling die, having an internal extrudate channel whose geometry is designed to induce laminar flow in the molten extrudate exiting the extrusion cooker before it reaches the cooling die. In particular, the invention is characterised by the relationship between rheological characteristics of the extrudate and key dimensions of the channel.

According to a first aspect, the invention provides a device for transferring molten proteinaceous extrudate material from the exit of an extrusion cooker barrel to a cooling die whilst promoting or maintaining laminar flow of said molten extrudate; wherein said device includes a transfer channel, through which extrudate flows immediately upon exiting the extrusion cooker barrel; and wherein said transfer channel incorporates a transition zone, immediately adjacent the exit of the extrusion cooker barrel, that has an internal profile that transitions from a shape matching the extrusion cooker barrel exit profile to a circular profile of diameter 'd', and a laminar flow development zone that has said circular profile; and wherein said laminar flow development zone has a minimum length ($L_e$) equal to $0.006 \times d \times Re$, where d=transfer channel diameter and Re=the Reynolds number associated with the flow of molten extrudate in said laminar flow development zone.

The device should also have an internal channel configuration wherein the internal profile of said laminar flow development zone a constriction zone wherein the internal diameter of the converges to a smaller diameter and then diverges to the diameter 'd'.

The Reynolds number is a dimensionless number defined with respect to a fluid flowing in an enclosed channel of diameter 'd' as follows:

$$Re = (\rho \cdot v \cdot L)/\mu$$

Where:
v=mean velocity of the fluid (m/s);
L=hydraulic diameter (m) i.e. the diameter of the channel if circular, otherwise the ratio of four times the cross-sectional area to the wetted perimeter of the channel;
$\rho$=fluid density (kg/m$^3$);
$\mu$=dynamic viscosity (Pa·s).

The device as defined above will induce laminar flow in the molten extrudate prior to the entry of the cooling die, as desired. The further advantage of defining the cooling die in this way is that the design can be successfully scaled up (or down) to higher (or lower) flow rates while still achieving laminar flow in the cooling die, which produces the most desirable results regarding the internal texture of the cooled extrudate.

Preferably, the device further includes a transformation zone wherein the channel has an internal profile that transitions from the circular profile of the laminar flow development zone to a profile that matches the internal profile of said cooling die.

The constriction provides a bridge between the melt flow through the cross-sectional 'figure 8' aperture at the exit of the twin-screw extruder and the cooling die channel. It tends to stabilise the melt flow pattern from being partly rotational and turbulent at the exit of the extruder, towards stable, linear flow in the cooling die.

The linear velocity at the constriction is preferred to be at least 10% greater than the linear velocity exiting the extruder. Subsequently, the linear velocity in the cooling die channel is preferred to be up to 10% greater than the linear velocity at the constriction. This velocity sequence dampens flow disruption and enhances fibre formation in the cooling die.

According to another aspect of the invention, there is provided a method of designing a device for transferring molten proteinaceous extrudate material from the exit of an extrusion cooker barrel to a cooling die whilst promoting or maintaining laminar flow of said molten extrudate; said device having an internal channel through which said extrudate flows comprising a laminar flow development zone and having a length $L_e$; said method including:

Selecting an internal channel diameter (d);
Determining the average flow velocity (v) of the extrudate in said diameter;
Determining the density (ρ) of the extrudate;
Determining the viscosity (μ) of the extrudate;
Determining the hydraulic diameter (L) of the extrudate flowing in said channel;
Determining the Reynolds Number (Re) for the extrudate flow in said channel;
Calculating the length $L_e$ by applying the formula: $L_e = 0.006 \times d \times Re$.

Now will be described, by way of a specific, non-limiting example, a preferred embodiment of the invention with reference to the drawings.

DETAILED DESCRIPTION OF THE INVENTION

The invention may be embodied as a transfer device that is affixed between the exit end of an extrusion cooker and the inlet to a cooling die, the device (which may be made of one or more parts) having an internal channel through which molten extrudate flows, wherein the channel has an internal geometry chosen to induce laminar flow of the extrudate at or before the point the extrudate enters the cooling die.

Part of the invention is the determination of the minimum required length of this channel to achieve laminar flow at the cooling die. The longer the transition, the more likely the melt will achieve laminar flow. However, longer channels bring risks, such as that the melt may cool and partially coagulate, leading to caking, poor internal texture formation. Longer channels are also likely to be costlier and heavier, meaning they are less practical to use.

To explain the context of the invention, the process in which the device operates is one that involves the transformation of blends of vegetable and animal proteins through an integrated cooking and cooling process that produces a fibrous texture, representing a homogeneous mixture of meat and plant protein. Particularly, it provides a method for taking an untextured, paste-like, batter-like protein product with no visible grain or texture and converting it into a texturised, fibrous protein product having the consistency of cooked muscle meat.

The core transformational step in the process is the extrusion cooker (or 'extruder'). The raw materials are heated in the main extruder barrel until molten. The resulting melt cooled via a continuous throughput cooling die after exiting the extruder to produce fibres from the melt, resulting in a product with a fibrous, chewy texture, characteristic of meat.

The cooling die is effectively a heat exchanger that enables a progressive rate of solidification of the melt, which in turn generates a laminated fibrous structure. The cooling die itself is a tubular steel conduit that defines the channel through which the product progresses, surrounded by a liquid-cooled jacket that progressively removes heat from the product, beginning as a molten liquid and exiting the cooling die as a solid product with an internal 'fibrous' texture.

It is highly desirable that the flow of molten extrudate in the cooling die is laminar in nature, as this produces the most desirable alignment of the proteins and therefore the most desirable internal texture upon cooling.

Figure 2:
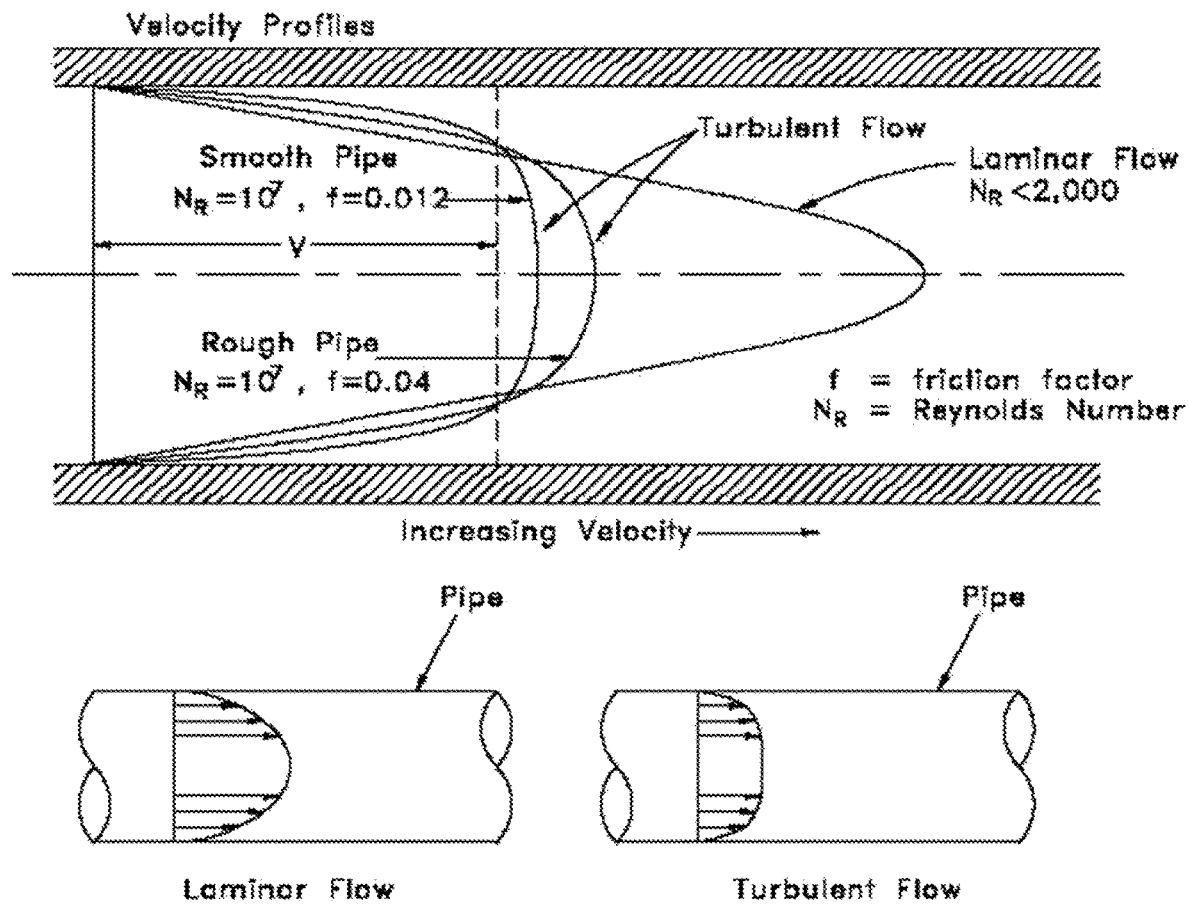
FIG. 2 is a schematic diagram illustrating types of fluid flow in a channel.

In fluid dynamics, 'laminar flow' occurs when a fluid flows in parallel layers, with no disruption between the layers. At low velocities, the fluid tends to flow without lateral mixing, and adjacent layers slide past one another: there are no cross-currents perpendicular to the direction of flow, nor eddies or swirls of fluids, as per FIG. 2.

Figure 3:
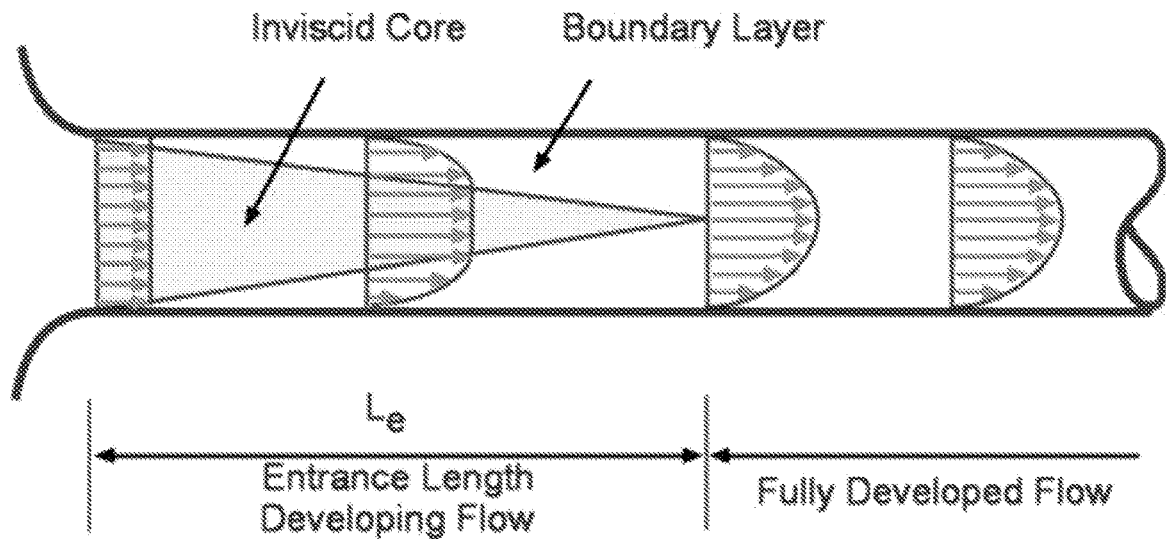
FIG. 3 is a schematic diagram illustrating the development of laminar flow of a fluid in a channel.

Extrudate in an extrusion cooker barrel undergoes very turbulent conditions. Therefore, prior to entering a cooling die, the extrudate must undergo some conditioning to achieve laminar flow. The inventors have determined that this can be achieved by using a transition flow conditioning device, interposed between the extruder and the cooling die, that has an internal geometry that will impose a laminar flow condition on the extrudate, as illustrated in FIG. 3.

In fluid dynamics, the Reynolds Number (Re) is a dimensionless number that can be used to express the flow characteristics of a fluid. It is the ratio of the inertial force to the shearing force of the fluid: how fast the fluid is moving relative to how viscous it is, irrespective of the scale of the fluid system. It is defined as follows:

$$Re = (\rho \cdot v \cdot L)/\mu$$

Where:
v=mean velocity of the fluid (m/s);
L=hydraulic diameter (m) i.e. the diameter of the channel if circular, otherwise the ratio of four times the cross-sectional area to the wetted perimeter of the channel;
ρ=fluid density (kg/m3);
μ=dynamic viscosity (Pa·s).

Typically, laminar flow occurs when the Reynolds number is below a critical value of approximately 2,040, though the transition range is typically between 1,800 and 2,100.

The inventors have determined that laminar flow can be induced into the molten extrudate by providing a transition channel that is circular in profile. Therefore, it is necessary to transform the flow profile from the shape of the extruder outlet to a circular cylinder, to establish laminar flow, and then (smoothly) to a shape matching the input and flow channel profile of the cooling die.

The inventors have further determined that, for the type of fluids normally encountered in extrusion cooking of HMEC, a key aspect of the geometry of a transition device is the length ($L_e$) of the cylindrical channel post-transformation in profile from the extruder exit shape. To establish and maintain laminar flow, this length can be calculated as:

$$\frac{L_e}{d} \approx 0.06 \, Re_d, \text{ for a Laminar Flow}$$

Typically for these types of extrudates, the following conditions apply (for calculating Re):
v=0.5 to 3.5 m/min;
L=60 to 150 mm;
ρ=1048 kg/m³;
μ=50 to 500 Pa·s.

A major advantage of using a design parameter based on dimensionless analysis via the Reynolds number is that scale-up (or scale-down) of the system is much simpler, as the relationship will hold for all dimensions.

This calculation is applicable to the length of the transition channel overall or can be applied to sub-sections of the transition channel.

It is also important to consider the angle at which the channel constricts after the extruder exit. It is preferably not too rapid a constriction, nor too slow a constriction, in the direction of flow.

Example—The feed materials are prepared according to their kind. If the formulation requires, meat is supplied in frozen blocks (approx. −18° C.) that are stripped and ground though a 13 mm hole plate and transferred to a mixing grinder with a 5 mm hole plate. Here it is combined with a first portion of water and a premixed blend of soy protein, gluten and flavourings/seasonings and ground at approximately 10° C. This mixture is transferred to an open throat progressing cavity of the extrusion cooker.

A second blend of soy protein, gluten and flavourings/seasonings is also prepared in a ribbon blender and transferred via a vacuum conveyer to a loss-in-weight feeder that meters the blend into a second feed-port in the extrusion cooker, in parallel with a second portion of water.

The extrusion cooker in this example is a twin-screw co-rotating extruder with a heated barrel, as supplied by Clextral, model BC72. The extrusion cooker screw profile is designed for optimised performance for texturization, based on increasing the residence time along the sections and enhancing specific mechanical energy input. In this embodiment, the screw profile comprises, from feed to discharge: 42% conveying elements, 42% CSTR (continuous stirred tank reactor) based mixing elements, and 16% high pressure pumping elements.

The molten mixture then exits the extrusion cooker barrel via an aperture resembling a 'figure-8' shape and passes through the transition device according to the invention into the cooling die.

The cooling die is typically a cross-flow heat exchanger, having a hollow stainless-steel conduit through which the product flows as it is cooled, and a surrounding jacket through which water is pumped to as a coolant to remove heat from the product. The conduit channel profile is rectangular in profile—145 mm wide and 20 mm deep.

Figure 1:
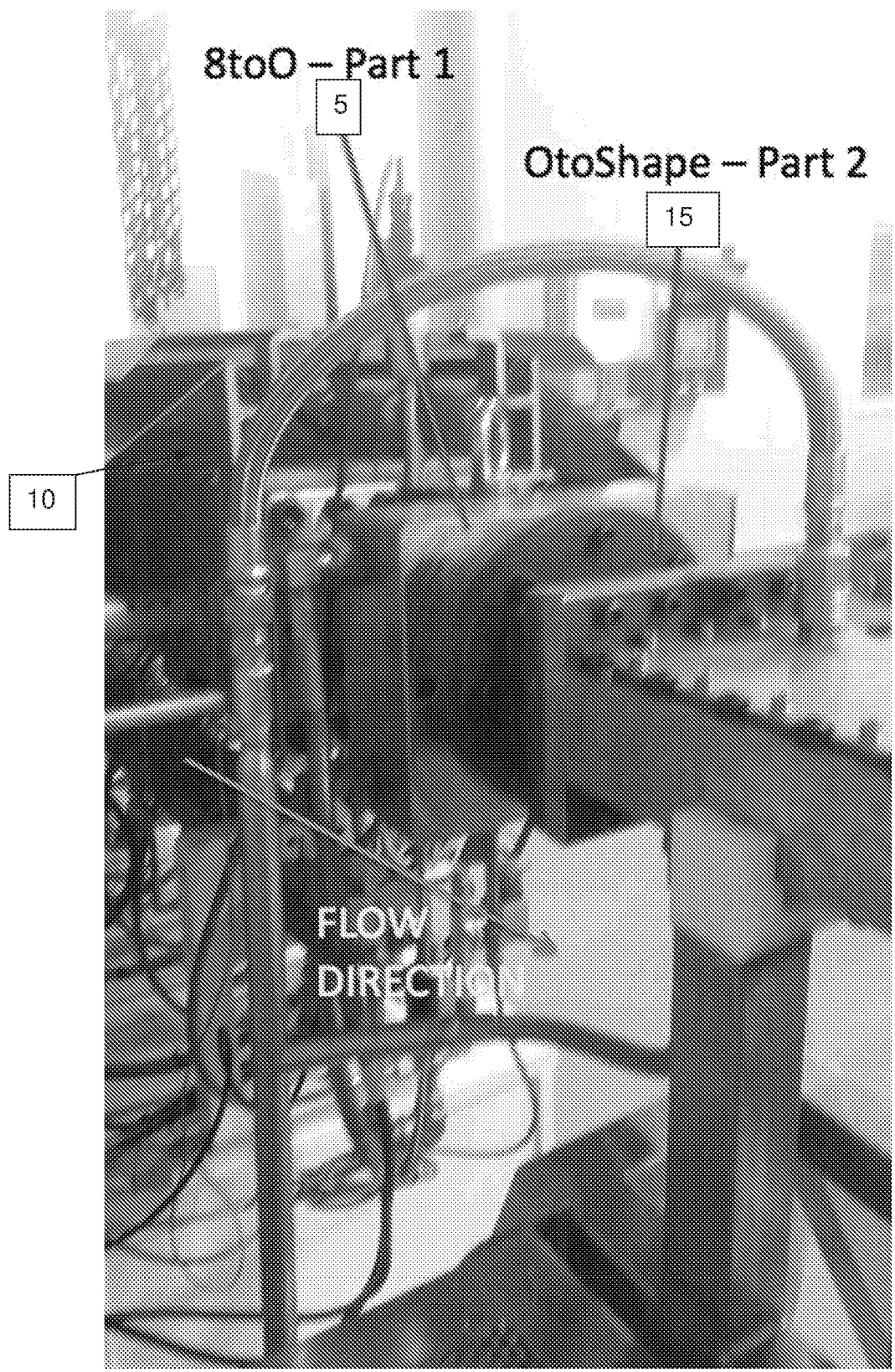
FIG. 1 is a photograph of device according to the invention shown connected in between an extrusion cooker and a cooling die.

As shown in FIG. 1, the transition device is made up of two distinct pieces—a first '8 to O' segment 5 that is affixed to the extrusion cooker 10, and an 'O to die' segment 15 than is affixed to the '8 to O' and to the cooling die 20.

Figure 4:
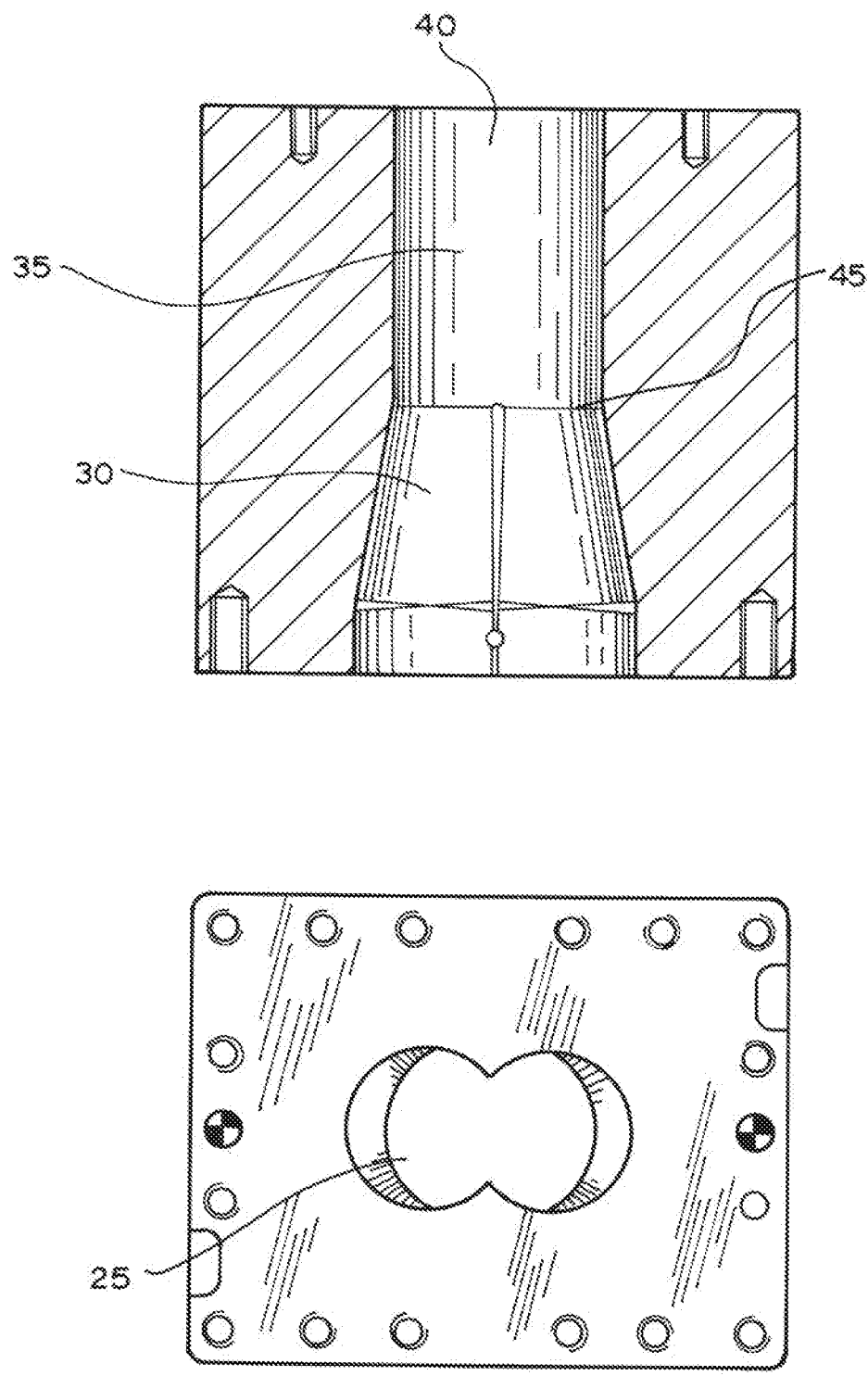
FIG. 4 is a cross-sectional drawing of a first part of a device according to the invention.

The detail of the piece embodying the '8 to O' segment is shown in FIG. 4. The 'figure 8' aperture 25 on the inlet matches the outlet aperture of the extruder barrel. There is a transition zone 30 that transforms the 'figure 8' shape into a cylindrical profile 35 having a diameter of 98.4 mm.

The laminar flow transition zone 40 begins at this point 45 in this piece. The length of this zone is approximately 144 mm in length in this piece.

The purpose of this piece is to dampen any 'swirl' generated by the co-rotating intermeshing screws of the extruder; maintain pressure of the flow; increase shear rate in the extrudate to accelerate flow to generate non-disruptive linear flow; and to discourage flow separation, which would otherwise lead to short fibre formation, by utilising smooth internal surfaces.

Preferably, the transition zone is internally heated, so that the melt temperature at the exit of the extruder is maintained to the cooling die.

Figure 5:
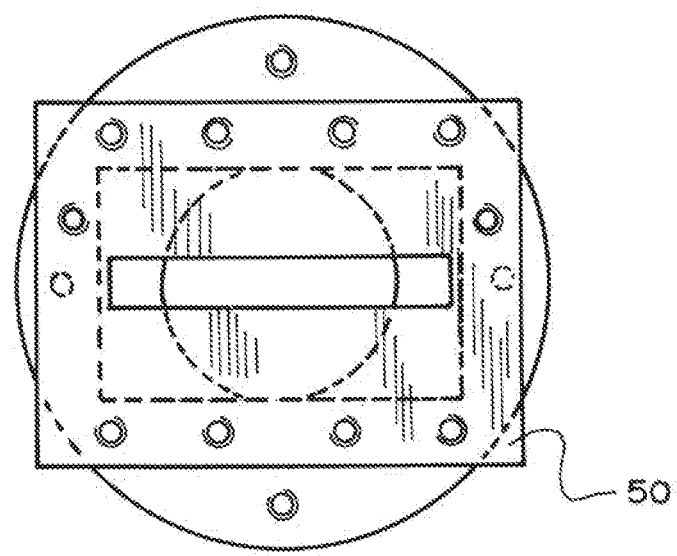
FIG. 5 is a schematic diagram of the profile of the extrudate flow channel in a device according to the invention.
Figure 5:
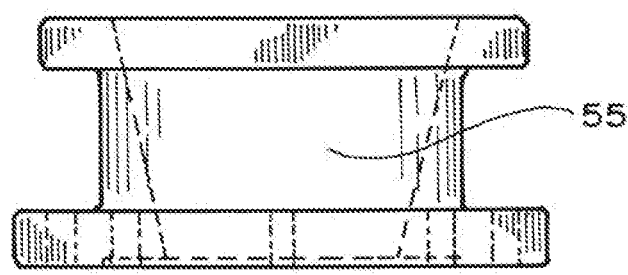

The piece 50 embodying the remainder of the laminar flow transition zone and the transformation zone from cylindrical profile to the cooling die channel profile is shown in FIG. 5. It has an overall thickness of 103 mm, and its internal channel profile 55 changes from circular profile of 98.4 mm to a slit 145 mm wide and 20 mm deep throughout this length.

The two above described pieces are typically bolted together. The internal channel surfaces of both pieces should conform to the following material requirements: stainless steel 304 or similar (17-4PH, Stavax, Mirrax, 1.2316); good corrosion resistance properties, toughness, heat resistance and wear-resistant properties; uniform hardness in all dimensions; ease of machinability and high surface finish and polish. The preferred hardness is HRC 33-36 (Hardness Rockwell C). Internal surface corners to be based on R20 curvature for smoothing. The surface finish to be at least equivalent to a 320 Grit Polished Surface and Electropolished to smooth out peaks yielding an Ra of 0.06μ.

It will be appreciated by those skilled in the art that the above described embodiment is merely one example of how the inventive concept can be implemented. It will be understood that other embodiments may be conceived that, while differing in their detail, nevertheless fall within the same inventive concept and represent the same invention.

The invention claimed is:

1. A device for transferring molten proteinaceous extrudate material from an exit of an extrusion cooker barrel to a single-channel cooling die whilst maintaining laminar flow of said molten extrudate; wherein said device includes:
   a transfer channel, through which extrudate flows immediately upon exiting the extrusion cooker barrel;
   wherein said transfer channel incorporates a transition zone, immediately adjacent the exit of the extrusion cooker barrel, that has an internal profile that transitions from a shape matching an extrusion cooker barrel exit profile, said shape having a wider horizontal dimension than a corresponding vertical dimension, to a circular profile of diameter 'd', and a laminar flow development zone that has said circular profile;
   wherein said laminar flow development zone has a minimum length ($L_e$) equal to 0.06×d×Re, where d=transfer channel diameter and Re=a Reynolds number associated with the flow of said molten extrudate molten extrudate in said laminar flow development zone; and wherein
   a internal profile of said laminar flow development zone incorporates a laminar flow transition zone wherein the horizontal dimension of the internal profile transitions to a smaller diameter and then diverges to the circular profile of diameter 'd'.

2. The device of claim 1, further comprising a transformation zone wherein the transfer channel has an internal profile that transitions from the circular profile of the laminar flow development zone to a profile that matches an internal profile of said cooling die.

\* \* \* \* \*